United States Patent [19]

George et al.

[11] 3,904,225

[45] Sept. 9, 1975

[54] ADJUSTABLE TRAILER HITCH

[76] Inventors: Jimmie George, P. O. Box 212; Charles P. Tyson, Rt. 1, both of Mer Rouge, La. 71261

[22] Filed: July 29, 1974

[21] Appl. No.: 492,679

[52] U.S. Cl. .................................... 280/478 R
[51] Int. Cl.² ................................. B60D 1/00
[58] Field of Search .......... 280/478 R, 477, 491 R, 280/491 B, 491 D

[56] References Cited
UNITED STATES PATENTS

| | | | |
|---|---|---|---|
| 2,386,195 | 10/1945 | Clark | 280/477 |
| 2,451,660 | 10/1948 | Clark et al. | 280/478 R |
| 2,898,127 | 8/1959 | Plumb | 280/478 R |
| 3,397,900 | 8/1968 | Sturges | 280/478 R |
| 3,427,045 | 2/1969 | Hoock | 280/478 R |
| 3,718,347 | 2/1973 | Mann | 280/478 R X |

*Primary Examiner*—Leo Friaglia
*Attorney, Agent, or Firm*—John M. Harrison

[57] ABSTRACT

An adjustable trailer hitch which includes a frame capable of being removably attached to the bumper or frame of a truck, car, other other vehicle, and a rotatable, extensible, hinged arm adapted to pivot on, extend from and retract into the frame. The arm is pivotally pinned at one end of the frame and is fitted with a hinge in the approximate center, which hinge permits the arm to selectively retract into, and extend from the frame, and to describe essentially a 90 degree angle when fully extended. The arm is fitted with a ball coupling adapted to mate with a ball receptacle mounted on the tongue or other frame member of a trailer to be towed.

9 Claims, 7 Drawing Figures

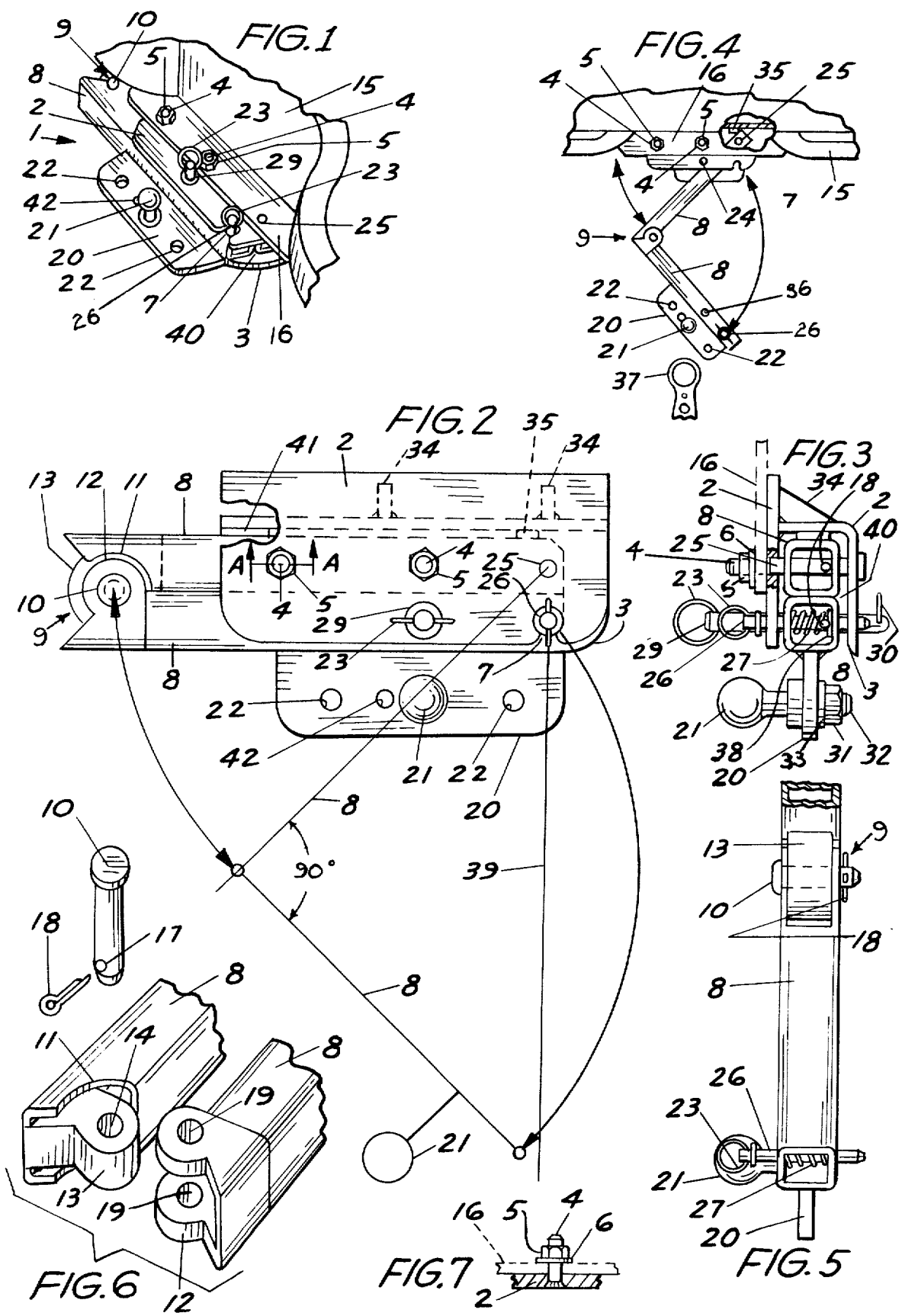

3,904,225

ADJUSTABLE TRAILER HITCH

BACKGROUND OF THE INVENTION

1. Field of the Invention

This invention relates to a new and improved trailer hitch, and more particularly, to a new and improved adjustable trailer hitch which may be removably fitted to substantially any trailer with a minimum of maneuvering of the vehicle to which the hitch is attached. The device can be removably mounted to the bumper of a car, truck or other vehicle and is fitted with a rotatable arm which is itself extensible and retractable, to permit locking of the ball carred by the arm to the trailer ball receptacle when the trailer is located in substantially any position within reach of the extended arm on the hitch.

2. Description of the Prior Art

Heretofore, various trailer hitches have been designed to removably lock to the ball receptacle of a trailering vehicle, such as a boat or cattle trailer. Most of these hitches are mounted in fixed relationship to the towing vehicle and cannot be removed from the vehicle without undergoing an extensive unbolting procedure. Furthermore, these hitches are characteristically mounted with the carrying ball very close to the vehicle frame, and the vehicle must, therefore, necessarily be backed very close to and in precise alignment with the trailer tongue in order to effect proper coupling of the trailer to the hitch. As a result, during the backing operation, the vehicle is frequently damaged by bumping the trailer tongue, and unless the ball attached to the hitch is in perfect alignment with the trailer ball receptacle, the receptacle will not lock positively onto the ball, and extensive additional maneuvering of the vehicle or trailer tongue is frequently necessary to achieve a firm and positive lock. This problem is, of course, intensified under circumstances where there is a large load on the trailer tongue, or the trailer is in an inaccessible position which prevents ready maneuvering of the trailer ball receptacle into alignment with the ball located on the hitch.

Many attempts have been made to develop an adjustable trailer hitch the ball of which may be extended and retracted from the vehicle frame in order to minimize the problem of hitch-to-trailer alignment. These efforts have chiefly taken the form of trailer hitches which are telescoping in nature, and which may be lengthened or shortened as desired by the removal and insertion of pins from a telescoping ball-carrying member. However, these devices are functionally limited since the ball can be moved only on a single axis extending to and from the vehicle frame. Accordingly, if after the vehicle is backed up, the ball receptacle is located on an axis not in line with the extension and retraction axis, then the same problem of maneuvering the ball receptacle on the trailer in alignment with the ball on the trailer hitch is presented. Furthermore, the telescoping hitch is subject to the disadvantage of rusting and caking with dirt, which impedes the telescoping operation.

Accordingly, an object of this invention is to provide an improved adjustable trailer hitch, the locking mechanism of which is capable of being initially extended independently of the carrying vehicle to cooperate with the locking apparatus of a trailer, and subsequently retracted into towing configuration.

Another object of the invention is to provide an adjustable trailer hitch which is capable of being extended, removably attached to a trailer, and retracted by backing the carrying vehicle to effect retraction of the hitch into towing configuration.

Still another object of this invention is to provide an improved adjustable trailer hitch, the ball of which may be coupled with a ball receptacle located on a trailer, under circumstances where the ball receptacle is located in substantially any position within the extension range of the ball from the hitch.

Yet another object of this invention is to provide an improved, adjustable trailer hitch which is characterized by great strength and which permits positive locking of the ball or other locking mechanism on the adjustable portion of the hitch with the ball receptacle or alternative mating receptacle of a trailer, without the necessity of additionally maneuvering the ball receptacle with respect to the ball, or the carrying vehicle with respect to the ball receptacle, after the ball and ball receptacle have been initially positioned within a predetermined distance of each other.

A further object of the invention is to provide an improved trailer hitch which permits maneuvering of an adjustable lock receptacle cooperating with the hitch into locking position with respect to a mating lock receptacle located on the tongue of a trailer after the vehicle carrying the trailer hitch has been backed into position such that the trailer lock receptacle is within extension range of the adjustable lock receptacle located on the hitch.

A still further object of the invention is to provide an improved adjustable trailer hitch the ball of which can be maneuvered into substantially any position within range of the extended arm of the hitch after the vehicle carrying the hitch is backed into close proximity to a trailer, the ball subsequently locked onto a ball receptacle located on the trailer, and the adjustable trailer hitch then automatically retracted into towing configuration by backing the vehicle carrying the hitch.

Another object of this invention is to provide a new and improved adjustable trailer hitch, the ball or alternative locking mechanism of which can be maneuvered within a specified, selected distance of a ball or alternative mating receptacle on a trailer, and subsequently adjusted to positively lock the ball to the ball receptacle without the necessity of further maneuvering the vehicle with respect to the trailer.

Yet another object of this invention is to provide an adjustable trailer hitch which may be removably mounted on the bumper or frame of a truck, automobile, motor home or other vehicle, and which when in retracted or folded position, occupies essentially no more space than a conventional trailer hitch.

A further object of the invention is to provide an adjustable trailer hitch which may be initially maneuvered into position with respect to a trailer, the arm, carrying a ball or other locking device extended and adjusted to cooperate with the ball receptacle or mating locking mechanism on the trailer, and the arm being subsequently locked into retracted configuration by simply again backing the towing vehicle.

A still further object of this invention is to provide an adjustable trailer hitch which may be initially bolted or otherwise attached to the rear or front of a vehicle; the vehicle maneuvered into position with respect to a trailer; the hitch ball locked onto trailer; the vehicle backed to effect automatic positive retraction of the hitch; and the trailer subsequently towed without the necessity of manually locking the hitch into retracted position.

SUMMARY OF THE INVENTION

These and other objects of the invention are provided in a new and improved adjustable trailer hitch which includes the following elements:

1. A frame capable of being permanently or removably mounted on the bumper or other frame member of a vehicle;

2. An arm pivoted to the frame at one end thereof and having a hinge in the approximate center, whereby the free end of the arm can be extended from the frame and retracted back into the frame as desired;

3. Means attached to the free end of the arm for mating with and positively locking to a cooperating mechanism on a trailer to be towed, upon extension of the arm from the frame.

4. Locking means for securing the arm into retracted position in the frame to achieve a desired pulling or towing configuration of the hitch.

BRIEF DESCRIPTION OF THE DRAWING

The invention will be better understood in view of the following description presented with reference to the accompanying drawings:

FIG. 1 of the drawing is a perspective view of the adjustable trailer hitch of this invention illustrated in retracted position and typically mounted on the bumper of a truck;

FIG. 2 is a top elevation of the adjustable trailer hitch illustrated in FIG. 1;

FIG. 3 is a side elevation of the adjustable trailer hitch illustrated in FIGS. 1 and 2;

FIG. 4 is a top elevation of the adjustable trailer hitch in extended configuration, illustrating the positioning of the ball with respect to a conventional trailer ball receptacle;

FIG. 5 is a side elevation, partially in section, of an extended portion of the arm of the adjustable trailer hitch illustrated in FIG. 4;

FIG. 6 is a perspective, exploded view of the elbow hinge in the pivoted arm of the adjustable trailer hitch illustrated in FIGS. 1 through 5; and FIG. 7 is a sectional view along lines A—A in FIG. 2 illustrating a preferred technique of mounting the adjustable trailer hitch on a vehicle.

DESCRIPTION OF THE PREFERRED EMBODIMENTS

Referring now to FIG. 1 of the drawing, the adjustable trailer hitch of this invention, generally illustrated by reference numeral 1, is shown bolted onto vehicle bumper plate 16, attached to vehicle bumper 15. As illustrated, the trailer hitch is preferably mounted to the vehicle bumper plate 16 by means of mounting bolts 4 and mounting nuts 5 in cooperation with mounting washers 6, as more particularly illustrated in FIG. 7 of the drawing. The trailer hitch may, of course, be welded to the vehicle frame if a permanent mount is desired. As illustrated, arm 8 is retracted into frame interior 40 of frame 2 by the action of elbow hinge 9 and arm pivot pin 25, and is securely held in place by arm lock pin 26. As an optional added safety precaution, arm safety pin 29 may be used to positively lock arm 8 into position in frame 2. When so retracted, adjustable trailer hitch 1 positions ball 21 bolted onto ball support 20 by means of ball bolt 32, ball nut 31 and ball lock washer 33, into conventional configuration with respect to a towed trailer. Safety chain apertures 22, located in ball support 20, are provided, as on conventional hitches, although the safety chain may be affixed to the vehicle frame if desired. It will be appreciated that pull rings 23, in cooperation with arm lock pin 26 and arm safety pin 29, are preferred in order to facilitate ready manipulation and removal and insertion of these pins in frame 2.

Referring now to FIGS. 2 and 3 of the drawing, it will be appreciated that elbow hinge 9 is designed to facilitate ready closure or retraction of arm 8 into frame interior 40 of frame 2. Arm lock pin 26 is designed to register with frame slot 7 when arm 8 is in retracted position, and spring 27 serves to bias arm lock pin 26 in place in an aperture in the bottom of frame 2 (not illustrated). Arm lock pin 26 is also fitted with arm lock pin guide 38, mounted in the interior of arm 8 in registration with the aperture in arm 8 in which lock pin 26 is located (not illustrated). Arm lock pin guide 38 serves to prevent arm lock pin 26 from moving out of registration with its mating aperture upon being pulled against the bias of spring 27 when arm 8 is pulled into extended configuration. Accordingly, when arm 8 is in retracted position as illustrated in FIGS. 2 and 3, a trailer may be coupled to ball 21 and towed with full assurance that arm 8 cannot inadvertently extend. In order to further positively secure arm 8 in retracted position with respect to frame 2, arm safety pin 29, fitted with arm safety pin lock 30 may be inserted in frame safety pin aperture 24 in frame 2, and registering arm safety pin aperture 36 in arm 8.

Referring now to FIG. 4 of the drawing, the adjustable trailer hitch is illustrated in extended position with arm lock pin 26 released from cooperation with frame 2, and arm 8 extended toward ball receptacle 37 of a conventional trailer (not illustrated). From a consideration of extended arm 8 in FIG. 4 of the drawing, and referring again to FIG. 2 of the drawing, it will be appreciated that ball 21 can be positioned anywhere within the radius of a multiplicity of circles each having as its center point arm pivot pin 25. This adjustment potential is effected by the combined function of elbow hinge 9 and arm pivot pin 25. For example, if ball receptacle 37 is positioned closer to adjustable trailer hitch 1 then it is as illustrated in FIG. 4, arm 8 can be retracted to approximately one-half of the extent illustrated in FIG. 4, positioned in cooperation with the ball receptacle and securely locked in place. In like manner, if ball receptacle 37 is positioned to the left or right of its position as illustrated in FIG. 4, arm 8 can be maneuvered either to the left or the right, as desired, by virtue of its pivot point at arm pivot pin 25, and can be maneuvered into cooperation with the ball receptacle by means of the cooperating pivot movement and provided by arm pivot pin 25 and the extension and retraction function permitted by elbow hinge 9.

Referring now to FIGS. 2, 5 and 6 of the drawing, and as heretofore noted, the unique extension and retraction maneuverability of adjustable trailer hitch 1 is permitted by means of the combined hinged function of elbow hinge 9 in cooperation with the pivoting function of arm 8 on arm pivot pin 25. Elbow hinge 9 is made functional by arm recess 11, notched into arm 8, and arm projections 12, in registration with arm recess 11, which cooperate with arm hinge plate 13, fitted within arm 8. Hinge plate aperture 14, in hinge plate 13, is adapted to register with arm projection apertures 19, in arm projections 12, to permit elbow hinge pin 10 to be placed into position in registration with arm projection apertures 19 and hinge plate aperture 14. Thus, arm projections 12, in cooperation with elbow hinge pin 10 and hinge plate 13, permits arm 8 to extend from frame 2 and describe essentially a 90 degree angle upon full extension of arm 8 as particularly illustrated in FIG. 2. Arm 8 is designed and adapted to extend to a point where the arm describes essentially a 90 degree angle, since further extension, in cooperation with maximum pivoting of arm 8 on arm pivot pin 25, would inhibit proper retraction of the hitch, as hereinafter described.

Referring again to FIGS. 2 and 4 of the drawing, it will be appreciated that the pivoting function of arm 8 with respect to frame 2 is achieved by the end of arm 8 which is pivoted to frame 2 by means of arm pivot pin 25. The pivoted end of arm 8 is designed to contact arm stop 35, affixed to frame 2, at full pivot of arm 8. Accordingly, arm stop 35, in cooperation with elbow hinge 9, operates to prevent ball 21 from traversing a predetermined point when arm 8 is fully extended and pivoted. This predetermined point is line 39 extending through arm pivot pin 25 perpendicular to the longitudinal axis of frame 2. If ball 21 were allowed to extend to the right of this line, arm 8 and ball 21 could fold to the right of, and away from frame 2, and would accordingly fail to lock into frame 2, as hereinafter described.

After ball 21 has been locked into ball receptacle 37, the vehicle carrying adjustable trailer hitch 1 can be backed up until arm lock pin 26 engages frame lip 3, and is automatically guided by frame slot 7 into the locked position as illustrated in FIGS. 1 and 2 of the drawing. Arm safety pin 29 can then be placed in frame safety pin aperture 24, if desired, for further safety.

As heretofore noted, it will be appreciated that frame 2 of adjustable trailer hitch 1 can be bolted or welded to the vehicle frame, if desired. If bolted, the hitch is preferably affixed to a vehicle frame or bumper by means of mounting bolts 4 and nuts 5, as illustrated in FIGS. 1 through 4 and particularly, FIG. 7, of the drawing. Bolts 4 are countersunk in frame 2 as illustrated to allow ample room within frame 2 for retraction of arms 8.

Referring again to FIGS. 1 and 2 of the drawing, it will be appreciated that while ball 21, mounted on ball support 20 and carried by arm 8, is a preferred means for securing the hitch to a trailer, alternative coupling devices may be used without departing from the spirit and scope of this invention. For example, ball 21 may be unbolted and removed from ball support 20, or a second coupling hole 42, provided in ball support 20 beside ball 21 to receive a pin from a clevis coupling mounted on a trailer tongue, in lieu of the usual ball coupling mechanism. Arm 8 can be extended and precisely positioned at the point where coupling hole 42 in ball support 20 registers with the clevis mounted on the trailer tongue, the clevis pin fitted into the registering holes, and the vehicle subsequently backed to effect automatic retraction of arm 8 into frame 2 for towing, as heretofore described. In the alternative, arm 8 can be removed, the clevis hitch matched with frame safety pin aperture 24 and arm safety pin 29 inserted to couple the clevis hitch to frame 2.

It will be further appreciated that alternative design techniques can be used to provide the desired arm extension and retraction functions without departing from the spirit and scope of the invention. For example, referring again to FIG. 4 of the drawing, arm stop 35 can be eliminated in favor of bevelling the pinned end of arm 8 such that this bevelled end will contact the interior of frame 2 at full extension of arm 8 to prevent ball 21 (or an alternative coupling means) mounted on the free end of arm 8 from rotating past line 39 running through arm pivot pin 25 at right angles to the longitudinal axis of frame 2.

While the trailer hitch of this invention is characterized by extensive arm retraction and extension capability, as heretofore discussed, the arm may be securely pinned in the frame for security by means of arm lock pin 26 and arm safety pin 29. Furthermore, referring again to FIG. 3 of the drawing, frame interior 40 of frame 2 serves as a vertical support for arm 8 in retracted towing configuration, since arm 8 fits snugly inside frame interior 40 with very little tolerance. The configuration of frame interior 40 is maintained in close tolerance with arm 8 by the rigidity of frame 2, which is strengthened by webs 34, designed to brace frame 2. Accordingly, ball 21 and arm 8 are allowed very little vertical movement and essentially no horizontal freedom while in the towing configuration.

Furthermore, arm brace 41, welded to frame 2, further prevents movement of arm 8 inside frame interior 40, and prevents excessive closure of arm 8 inside frame 2.

While the adjustable trailer hitch of this invention is designed to be retracted prior to towing a trailer after the latter is locked onto the hitch, the hitch design is such that towing may be achieved while the hitch is in extended configuration. Thus, under circumstances where the trailer to be moved is located in an inaccessible spot, the hitch-carrying vehicle can be backed as closely as possible, the hitch arm extended and coupled to the trailer, and the trailer towed out of the confined area with the hitch still in extended configuration. After the trailer is moved to the point where the vehicle may again be backed up, this maneuver is accomplished, the hitch automatically retracted, and normal towing configuration achieved.

The strength of the arm and frame while in extended configuration is also important as a safety feature in the highly unlikely event of inadvertent extension of the hitch during the towing operation. Again referring to FIGS. 2 and 4 of the drawing, if such extension should occur due to failure of arm lock pin 26 and arm safety pin 29, elbow hinge 9 and arm pivot pin 25 are designed to independently bear the towing load, and the trailer would still be secure.

It will be appreciated that adjustable trailer hitch 1 is capable of being disassembled by merely removing key pins. Thus, referring to FIG. 6 of the drawing, arm 8 can be disassembled at elbow hinge 9 by removing cotter pin 18 from elbow hinge pin aperture 17, and subsequently removing elbow hinge pin 10. In like manner, arm 8 can be removed from frame 2 by repeating the cotter pin removal procedure and pulling arm pivot pin 25 out of registering apertures in arm 8 and frame 2. Furthermore, as heretofore discussed, the entire hitch can be removed from the carrying vehicle by removal of mounting nuts 5 from mounting bolts 4 attached to frame 2. Accordingly, if arm 8, ball support 20, or frame 2 is damaged, the appropriate pins can be removed and new parts inserted, as desired, without the necessity of replacing the entire hitch.

Having described my invention with the particularity set forth above, what is claimed is:

1. An adjustable trailer hitch comprising:
   a. a hollow frame capable of being mounted on a vehicle for housing a hitch arm;
   b. an arm pivoted to said frame at one end thereof, said arm having an elbow hinge intermediate the ends thereof subdividing said arm into a pair of pivotal arm members relatively movable about said hinge and including stop portions which abut to form an angle of about ninety degrees when said arm is fully extended about said hinge and pivoted out of said frame, and to fold about said hinge into parallel abutting relation when said arm is pivoted into a fully retracted position within said frame;
   c. means carried by the free end of said arm for releasably locking to a trailer to permit towing of said trailer by said vehicle.

2. The trailer hitch of claim 1 wherein said frame is adapted to be bolted onto said vehicle.

3. The trailer hitch of claim 1 wherein one end of said arm is releasably and pivotally secured to said frame by a pin.

4. The trailer hitch of claim 1 wherein said means carried by the free end of said arm is a ball.

5. The trailer hitch of claim 1 wherein:
   a. said frame is bolted onto said vehicle;
   b. one end of said arm is releasably and pivotally secured to said frame by a pin; and
   c. said means carried by the free end of said arm is a ball.

6. The trailer hitch of claim 1 further comprising stop means mounted on said frame in cooperation with said arm to prevent said arm from pivoting past a predetermined point with respect to said frame when said arm is extended from said frame.

7. An adjustable trailer hitch comprising:
   a. a hollow frame for housing a hitch arm capable of being removably mounted on a vehicle;
   b. an arm pivoted in the interior of said frame at one end of said arm and carrying an elbow hinge intermediate the ends thereof subdividing said arm into a pair of pivotal arm members relatively movable about said hinge and including stop portions which abut to form an angle of about ninety degrees when said arm is fully extended about said hinge and pivoted out of said frame, and to fold about said hinge into parallel abutting relation when said arm is pivoted into a fully retracted position within said frame; and
   c. lock means carried by the free end of said arm for removably cooperating with a mating receptable on a trailer to permit towing of said trailer by said vehicle.

8. The adjustable trailer hitch of claim 7 wherein said lock means is a ball, and retraction of said hitch is achieved by backing said vehicle after effecting removable cooperation between said lock means and said receptacle.

9. The adjustable trailer hitch of claim 8 further comprising an arm lock pin carried by said arm to lock said arm into retracted position in said frame.

* * * * *